United States Patent
Narayana

(10) Patent No.: US 9,536,548 B1
(45) Date of Patent: Jan. 3, 2017

(54) MAGNETIC WRITE HEAD WITH NOVEL HOT SEED DESIGN TO MITIGATE ADJACENT TRACK INTERFERENCE

(71) Applicant: HGST Netherlands B.V., Amsterdam (NL)

(72) Inventor: Supradeep Narayana, Santa Clara, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/047,585

(22) Filed: Feb. 18, 2016

(51) Int. Cl.
G11B 5/17 (2006.01)
G11B 5/31 (2006.01)

(52) U.S. Cl.
CPC ........... G11B 5/3113 (2013.01); G11B 5/17 (2013.01); G11B 5/3163 (2013.01)

(58) Field of Classification Search
CPC ............ G11B 5/17; G11B 5/127; G11B 5/147
USPC .......................... 360/123.03–123.06, 125.02, 125.3, 360/125.31
See application file for complete search history.

(56) References Cited

U.S. PATENT DOCUMENTS

| | | | |
|---|---|---|---|
| 6,912,106 B1 | 6/2005 | Chen et al. | |
| 7,238,292 B1 | 7/2007 | He et al. | |
| 7,337,530 B1 | 3/2008 | Stoev et al. | |
| 8,331,058 B2 | 12/2012 | Gider et al. | |
| 9,053,713 B2 | 6/2015 | Wang et al. | |
| 2007/0035878 A1 | 2/2007 | Guthrie et al. | |
| 2007/0285847 A1* | 12/2007 | Lin | B82Y 25/00 360/324.1 |
| 2009/0197121 A1* | 8/2009 | Inturi | G11B 5/3133 428/812 |
| 2013/0119495 A1* | 5/2013 | Vetr | H01L 43/08 257/421 |

OTHER PUBLICATIONS

Inturi, et al., "Practical FeCo Films for Perpendicular Writer Pole," IEEE Trans. on Magnetics, vol. 48, No. 5, May 2012, pp. 1718-1722.
Kanai, Y., et al., "Micromagnetic Analysis to Reduce Adjacent Track Erasure Field in Planar Write Heads," IEEE Transactions on Magnetics, vol. 47, No. 10, pp. 3399-3402, Oct. 2011.
Kim, D.Y., et al., "Exchange Coupling in NiFe/Ni Bilayer Fabricated by Electrodeposition," Journal of Magnetics 16(2), pp. 97-100, 2011.
Morley, Nicola A., et al., "Magnetic and Structural Characterization of NiFe/Fe30Co70 Bilayers," IEEE Trans. on Magnetics, vol. 50, No. 11, 2503704, Nov. 2014.

(Continued)

Primary Examiner — Allen T Cao
(74) Attorney, Agent, or Firm — Jacobsen IP Law; Krista S. Jacobsen

(57) ABSTRACT

Disclosed herein is a magnetic write head comprising a main pole, a write gap over the main pole, a first hot seed layer over the main pole, wherein the first hot seed layer comprises a first hot seed material having a first anisotropy value, and a second hot seed layer comprising a second hot seed material having a second anisotropy value, the second anisotropy value being greater than the first anisotropy value, wherein at least a portion of the second hot seed layer is adjacent to the first hot seed layer to mitigate adjacent track interference. Also disclosed are methods to fabricate magnetic write heads having first and second hot seed layers.

20 Claims, 9 Drawing Sheets

(56) References Cited

OTHER PUBLICATIONS

Shimokoshi, M., et al., "Investigation for Mechanism of Far Track Interference in Hard Disk Drives," in IEEE Transactions on Magnetics, vol. 51, No. 7, pp. 1-8, Jul. 2015.
Stenning, G.B.G., et al., "Magnetization dynamics in an exchange-coupled NiFe/CoFe bilayer studied by x-ray detected ferromagnetic resonance," New J. Phys. 17 (2015) 013019.
Yu, Guoshing, et al., "Skew Effect-Induced Track Erasure of Shingled Magnetic Recording System," IEEE Transactions on Magnetics, vol. 50, No. 11, pp. 1-4, Nov. 2014.

* cited by examiner

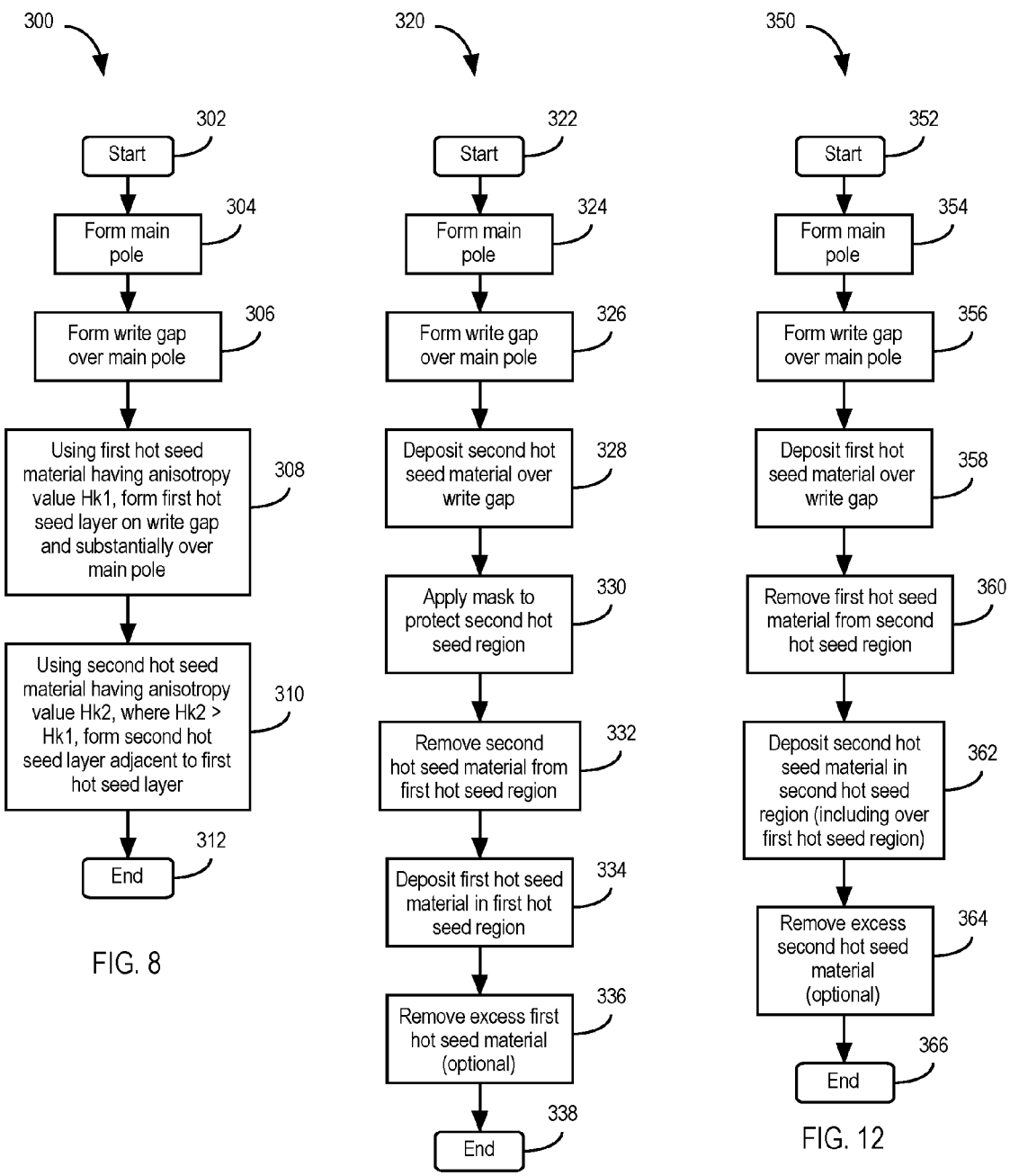

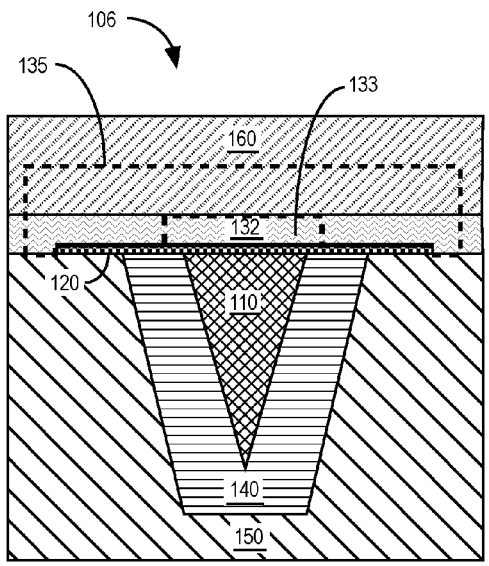 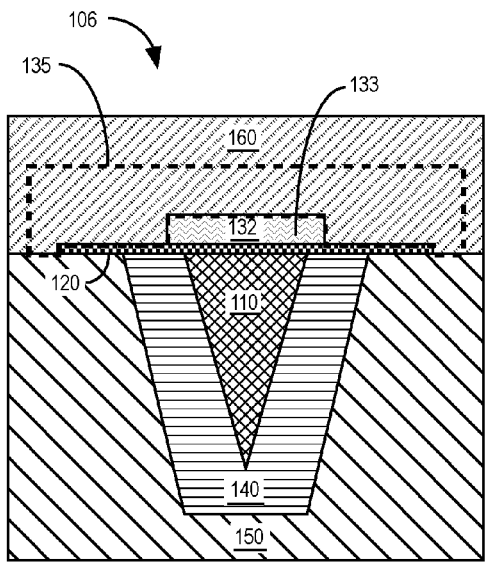
FIG. 13A  FIG. 13B
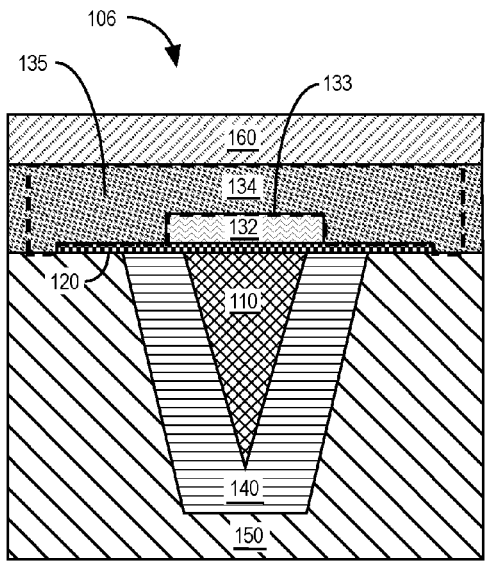 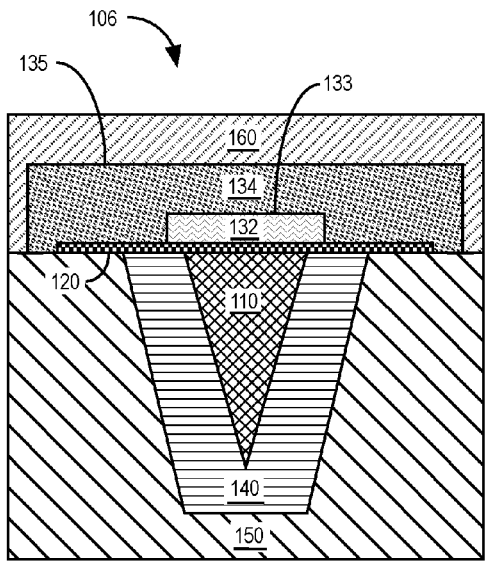
FIG. 13C  FIG. 13D

MAGNETIC WRITE HEAD WITH NOVEL HOT SEED DESIGN TO MITIGATE ADJACENT TRACK INTERFERENCE

BACKGROUND

Magnetic storage systems, such as hard disk drives, are used to store large amounts of information on tracks, such as the circularly-arranged, adjacent tracks of a magnetic disk. A magnetic head in a magnetic storage system typically includes a read/write transducer for storing magnetically encoded information on, and later retrieving that information from, a magnetic recording medium, such as a disk.

Because a magnetic recording head typically provides a strong writing field to achieve a high areal density, the writer may cause interference in adjacent tracks on the disk when writing to an intended track. This interference may result in the erasure of information previously written to adjacent tracks. The so-called adjacent-track interference may be particularly problematic as designers increase the number of tracks per inch and/or reduce the track pitch to increase the areal density of magnetic recording media.

Therefore, there is an ongoing need to design magnetic recording heads with improved adjacent-track-interference characteristics.

SUMMARY

Disclosed herein are magnetic write heads having multiple hot seed layers to mitigate adjacent-track interference, and hard disk drives comprising such magnetic write heads. In some embodiments, a magnetic write head comprises a main pole, a write gap, a first hot seed layer, and a second hot seed layer. In an air-bearing surface (ABS) view of the magnetic write head, the write gap is over the main pole. The first hot seed layer comprises a first hot seed material having a first anisotropy value, wherein, in the ABS view of the magnetic write head, the first hot seed layer is on the write gap and substantially over the main pole. The second hot seed layer comprises a second hot seed material having a second anisotropy value, the second anisotropy value being greater than the first anisotropy value, wherein, in the ABS view of the magnetic write head, at least a portion of the second hot seed layer is adjacent to the first hot seed layer. In some embodiments, the second anisotropy value is at least three times the first anisotropy value. In some embodiments, the first anisotropy value is between approximately 15 and 20 Oe, and the second anisotropy value is between approximately 75 and 150 Oe. In some embodiments, the first hot seed material or the second hot seed material comprises $Fe_{75}Co_{25}$ or $Fe_{70}Co_{30}$.

In some embodiments, the second hot seed layer includes a first portion adjacent to a first side of the first hot seed layer and a second portion adjacent to a second side of the first hot seed layer. In some embodiments, a thickness of the first hot seed layer or the second hot seed layer is approximately three times a thickness of the write gap. In some embodiments, the second hot seed layer extends over the first hot seed layer.

Also disclosed herein are methods to fabricate magnetic write heads having multiple hot seed layers to mitigate adjacent-track interference, magnetic write heads fabricated using such methods, and hard disk drives comprising such magnetic write heads. In some embodiments, a method of fabricating a magnetic write head comprises forming a main pole, forming a write gap, forming a first hot seed layer, and forming a second hot seed layer. In an air-bearing surface (ABS) view of the magnetic write head, the write gap is over the main pole, the first hot seed layer is on the write gap and substantially over the main pole, and at least a portion of the second hot seed layer is adjacent to the first hot seed layer. The first hot seed layer comprises a first hot seed material having a first anisotropy value, and the second hot seed layer comprises a second hot seed material having a second anisotropy value that is greater than the first anisotropy value. In some embodiments, the second anisotropy value is at least three times the first anisotropy value. In some embodiments, the first anisotropy value is between approximately 15 and 20 Oe, and the second anisotropy value is between approximately 75 and 150 Oe. In some embodiments, the first hot seed material or the second hot seed material comprises $Fe_{75}Co_{25}$ or $Fe_{70}Co_{30}$.

In some embodiments, forming the first hot seed layer comprises depositing the first hot seed material using physical vapor deposition. In some embodiments, forming the second hot seed layer comprises depositing the second hot seed material using ion beam deposition. In some embodiments, forming the second hot seed layer comprises depositing the second hot seed material over the write gap, applying a mask to expose a first hot seed region and to protect a second hot seed region, and removing a portion of the second hot seed material from the first hot seed region. In some such embodiments, the mask is a photolithographic mask, and removing the portion of the second hot seed material from the first hot seed region comprises exposing the magnetic write head to a light source. In some such embodiments, the first hot seed layer is formed by depositing the first hot seed material in the first hot seed region after removing the portion of the second hot seed material from the first hot seed region.

In some embodiments, forming the first hot seed layer comprises depositing the first hot seed material on the write gap, the deposited first hot seed material comprising a first portion residing in a first hot seed region and a second portion residing in a second hot seed region, and removing the second portion of the first hot seed material. In some such embodiments, removing the second portion of the first hot seed material comprises milling to confine the first hot seed material to the first hot seed region. The milling process may also remove a portion of the write gap.

In some embodiments, forming the second hot seed layer comprises depositing the second hot seed material in the second hot seed region, which extends over the first hot seed region, after removing the second portion of the first hot seed material. In some such embodiments, the method further comprises removing a portion of the second hot seed material outside of the second hot seed region. In some such embodiments, removing the portion of the second hot seed material comprises milling to confine the second hot seed material to the second hot seed region.

BRIEF DESCRIPTION OF THE DRAWINGS

The disclosure herein is illustrated by way of example, and not by way of limitation, in the figures of the accompanying drawings, in which like reference numerals refer to similar elements and in which:

FIG. 8 is a flowchart illustrating an exemplary process to fabricate a portion of a magnetic read and write head having a first hot seed layer and a second hot seed layer in accordance with some embodiments.

FIG. 9 is a flowchart illustrating an exemplary process to fabricate a portion of a magnetic read and write head having a first hot seed layer and a second hot seed layer in accordance with some embodiments.

FIG. 12 is a flowchart illustrating an exemplary process to fabricate a portion of a magnetic read and write head having a first hot seed layer and a second hot seed layer in accordance with some embodiments.

FIGS. 13A through 13D illustrate the write portion of an exemplary magnetic read and write head after various steps of the exemplary process illustrated in FIG. 12.

DETAILED DESCRIPTION

The following description is made for the purpose of illustrating the general principles of the present disclosure and is not meant to limit the inventive concepts claimed herein. Furthermore, particular embodiments described herein may be used in combination with other described embodiments in various possible combinations and permutations.

Figure 1:
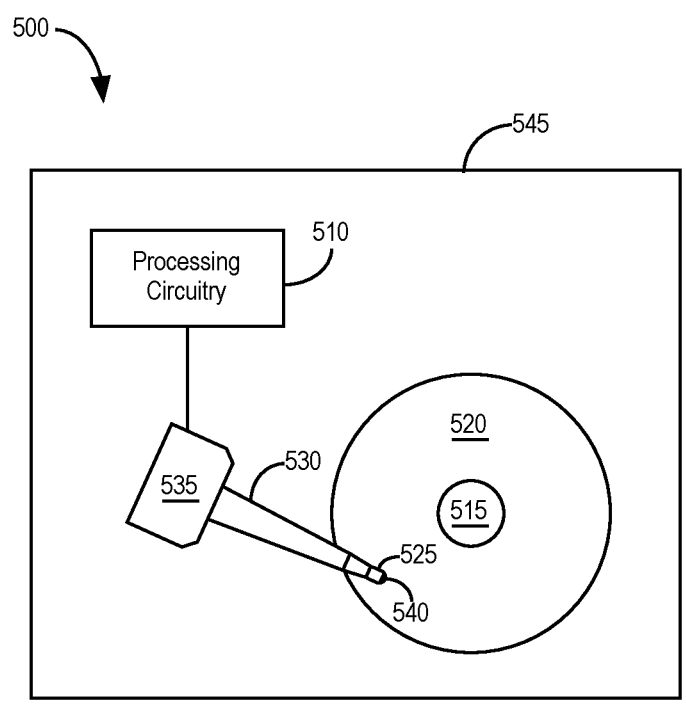
FIG. 1 illustrates several components of an exemplary hard disk drive in accordance with some embodiments.

FIG. 1 illustrates several components of an exemplary hard disk drive 500 in accordance with some embodiments. The magnetic hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, includes a combined read and write magnetic head 540. An actuator 535 rotatably positions the suspension and actuator arm 530 over the magnetic disk 520. The components of the hard disk drive 500 may be mounted on a housing 545. It is to be understood that although FIG. 1 illustrates a single disk 520, a single slider 525, a single head 540, and a single suspension and actuator arm 530, hard disk drive 500 may include a plurality (i.e., more than one) of disks 520, sliders 525, heads 540, and suspension and actuator arms 530.

The slider 525 has a gas-bearing surface that faces the surface of the disk 520 and counteracts a preload bias that pushes the slider toward the disk 520. For convenience, in this document the gas-bearing surface is referred to as the air-bearing surface (ABS) and the gas is generally referred to as "air," although it is to be understood that the gas used in a hard disk drive 500 may be a gas other than air (e.g., the gas may be helium). For simplicity, throughout this disclosure, the surface of the slider 525 that faces or that will eventually face the disk 520 is referred to as the ABS.

As the disk 520 rotates, the disk 520 drags air under the slider 525 and along the ABS in a direction approximately parallel to the tangential velocity of the disk 520. As the air passes under the ABS, air compression along the air flow path causes the air pressure between the disk 520 and the ABS to increase, which creates a hydrodynamic lifting force that counteracts the tendency of the suspension and actuator arm 530 to push the slider 525 toward the disk 520. The slider 525 thus flies above the disk 520 but in close proximity to the surface of the disk 520.

In operation, the actuator 535 moves the suspension and actuator arm 530 to position the slider 525 so that the magnetic head 540 is in a transducing relationship with the surface of the magnetic disk 520. The head 540 may be used to write information to one or more tracks on the surface of the disk 520 and to read previously-recorded information from the tracks on the surface of the disk 520. Processing circuitry 510 provides to the head 540 signals representing information to be written to the disk 520 and receives from the head 540 signals representing information read from the disk 520. The processing circuitry 510 also provides signals to the spindle motor to rotate the magnetic disk 520, and to the actuator 535 to move the slider 525 to various tracks.

For writing, the head 540 may use a single pole writer that has a main pole surrounded by magnetic shield materials. The main pole is typically separated from the magnetic shield materials by a nonmagnetic spacer layer. The main pole may have a tapered shape with a tip that faces the magnetic recording medium and is part of the ABS. The single pole writer may include a conductive coil encircling the writer pole in a helical or pancake like configuration.

To write to the disk 520, the slider 525 passes over a region of the disk 520, and an electric current is applied through the coil of the head 540, which causes a large magnetic field to be generated from the main pole tip. The polarity of the generated field causes a region of the magnetic disk 520 to assume a polarity, thus enabling information to be stored on the disk 520.

To read information from the disk 520, the head 540 may include only one read sensor, or it may include multiple read sensors. The read sensor(s) in the head 540 may include, for example, one or more giant magnetoresistance (GMR) sensors, tunneling magnetoresistance (TMR) sensors, or another type of magnetoresistive sensor. When the slider 525 passes over a region of the disk 520, the head 540 detects changes in resistance due to magnetic field variations recorded on the disk 520, which represent the recorded bits.

Figure 2:
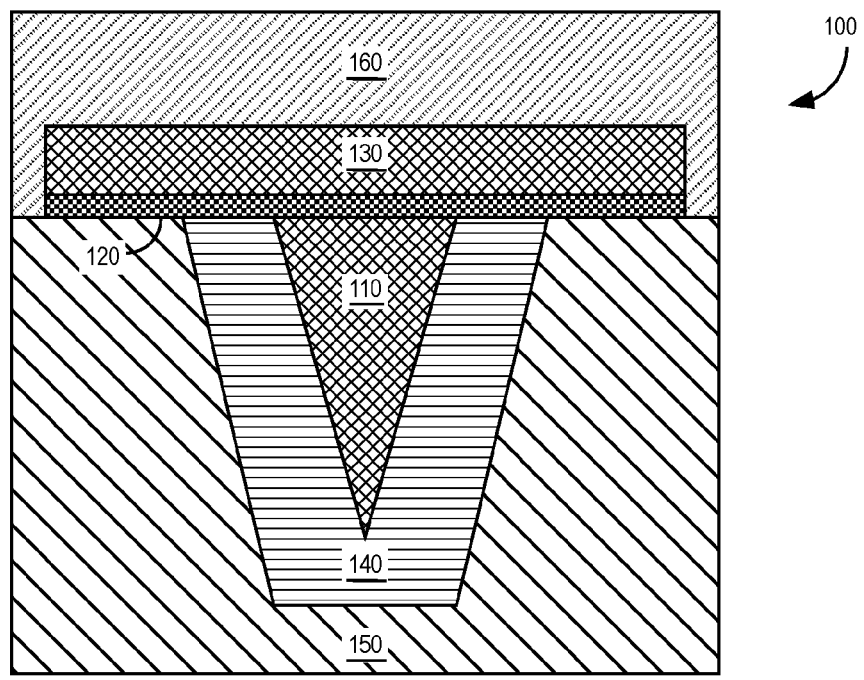
FIG. 2 illustrates an ABS view of a write portion of a conventional magnetic read and write head.

FIG. 2 illustrates an ABS view of a write portion 100 of a conventional read and write head 540. The write portion 100 includes a main pole 110, a write gap 120, and a hot seed layer 130. In addition, the write portion 100 of the head 540 includes a side gap 140, a side shield and leading edge shield region 150, and a top shield 160. The functions of the side gap 140, the side shield and leading edge shield region 150, and the top shield 160 are well understood in the art and are not discussed in detail herein. It is to be understood that FIG. 2 does not illustrate some portions of the head 540, including certain components used to write to the disk 520. For example, FIG. 2 does not illustrate the coil of the head 540.

The main pole 110 may have, for example, a triangular or trapezoidal shape. FIG. 2 illustrates a main pole 110 that has a triangular shape. The side shield and leading edge shield region 150 around the main pole 110 is made from soft magnetic shield materials. The nonmagnetic space between the main pole 110 and the side shield and leading edge shield region 150 is the side gap 140, and the nonmagnetic space above the main pole 110 is the write gap 120.

The hot seed layer 130 is deposited over the write gap 120. Typically, the hot seed layer 130 is made from a high-magnetic-moment material, such as Fe(1-x)Co(x) (x=20-55 at %), Fe(1-y)Ni(y) (y=5-55 at %), or a similar soft, high-moment material. As shown by the use of the same fill pattern in FIG. 2 for the hot seed layer 130 and the main pole 110, the material forming the hot seed layer 130 may be substantially identical to the material used to form the main pole 110. Specifically, the hot seed layer 130 may be fabricated from a soft material having a high magnetic moment similar or identical to that of the main pole 110. By fabricating the hot seed layer 130 from such a material, the moment of the hot seed layer 130 readily follows the moment of the main pole 110, thereby improving writability on the center track (i.e., the track being written).

Figure 3:
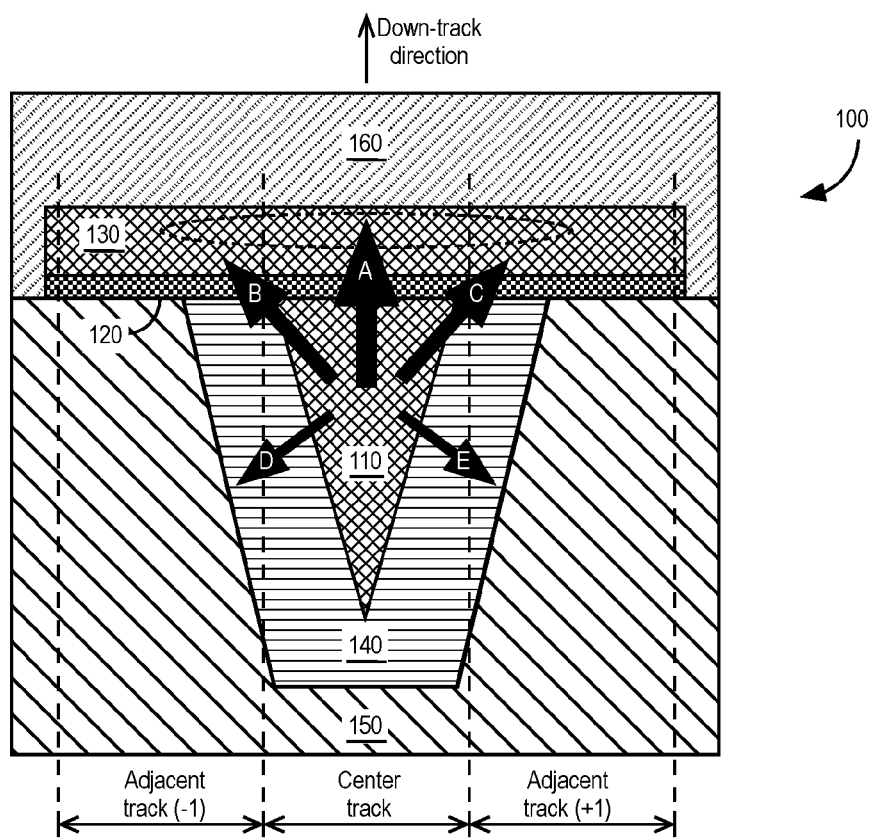
FIG. 3 illustrates the potential for adjacent-track interference in a conventional magnetic read and write head.

The width of the hot seed layer 130 in a conventional head 540 exceeds the width of the main pole 110, as shown in FIG. 2, and typically overlaps the tracks of the disk 520 that are immediately adjacent to the center track. FIG. 3 illustrates how adjacent-track interference may result in this configuration because the hot seed layer 130 extends over adjacent tracks on the disk 520. The arrows A through E of FIG. 3 illustrate conceptually the magnitude of the magnetic field produced in various directions when a write current is applied to the conventional head 540 having the write portion 100 of FIG. 2. As shown by the arrow A, the write current causes a large component of the magnetic field gradient to be produced in the down-track direction. This component of the magnetic field interacts with the region of the disk 520 under the main pole 110 and causes information to be written to the desired center track of the disk 520 in accordance with the direction of the magnetic field. Specifically, the gradient of the magnetic field between the main pole 110 and the hot seed layer 130 enables the information to be recorded.

As shown by the arrows B through E, however, some of the magnetic field produced is directed toward the tracks that are adjacent to the center track (labeled as "Adjacent track (−1)" and "Adjacent track (+1)" in FIG. 3). The side gap 140 and side shield and leading edge shield region 150 largely absorb or redirect many undesirable magnetic field components, such as those in the up-track direction, represented by the arrows D and E. But because the hot seed layer 130 is made of a soft magnetic material selected to cause the moment of the hot seed layer 130 to follow the moment of the main pole 110 (i.e., switch almost synchronously with the main pole 110), the magnetic field represented by the arrows B and C can cause adjacent-track interference—that is, undesirable writing to or erasure of adjacent tracks because the hot seed layer 130 extends over not only over the center track, but also over the adjacent tracks. Therefore, conventional heads 540 may cause adjacent-track interference because the use of a soft magnetic material for the hot seed layer 130 effectively extends the write region into adjacent tracks.

Figure 4:
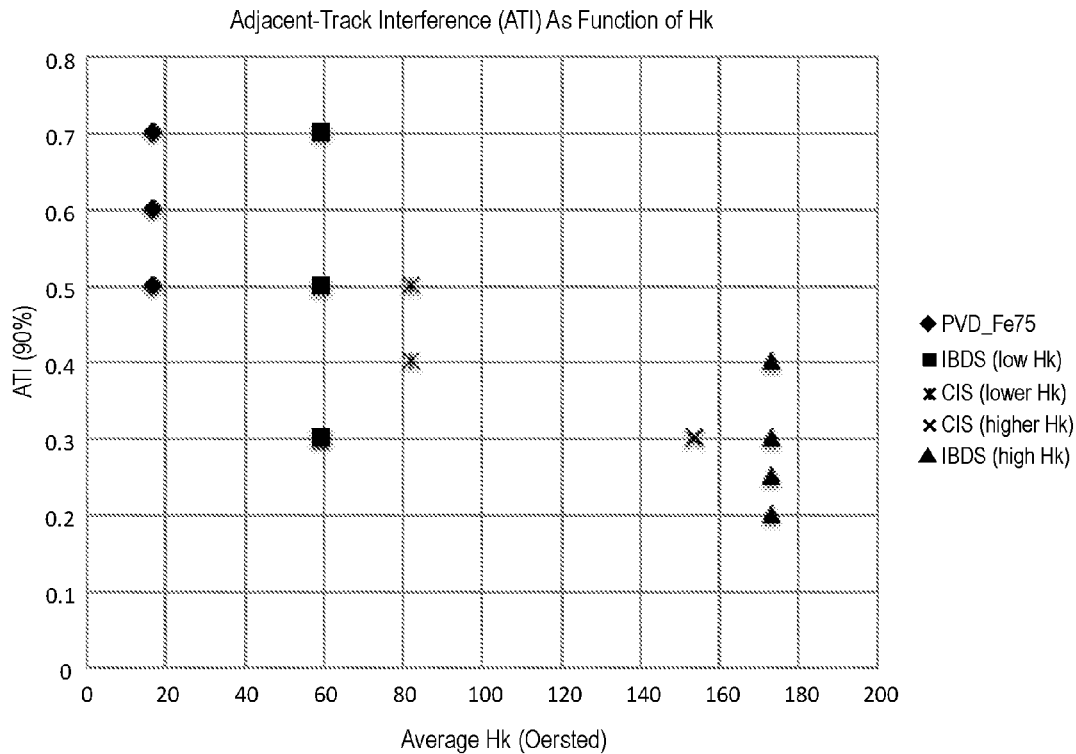
FIG. 4 illustrates the dependence of adjacent-track interference on the magnetic anisotropy of the hot seed layer.

FIG. 4 illustrates the influence of the magnetic anisotropy of the hot seed material on adjacent-track interference and specifically shows that the adjacent-track interference is generally inversely proportional to the anisotropy value of the hot seed material. FIG. 4 illustrates measurements from several write portion samples in which the second hot seed layer 134 was deposited using physical vapor deposition (labeled "PVD_Fe75"), ion-beam deposition (labeled "IBDS"), and CIS deposition (labeled "CIS"). As FIG. 4 shows, the adjacent-track interference is generally lower for higher-Hk materials deposited using ion-beam deposition or CIS deposition than for PVD.

Figure 5:
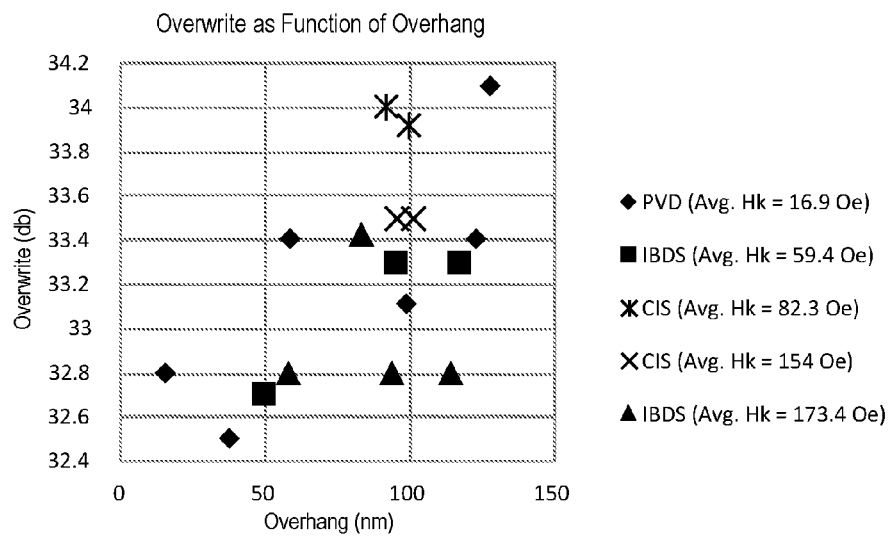
FIG. 5 illustrates the perpendicular overwrite (OW) in decibels (db) as a function of overhang (OH).

FIG. 5 plots the perpendicular overwrite (OW) as a function of overhang for several write portion samples using different hot seed materials. The overhang is the amount by which the write gap 120 extends beyond the side gap 140. FIG. 5 plots the average distance by which the overhangs to the left and to the right of the side gap 140 extend beyond the side gap 140. As shown in FIG. 5, for a selected overhang distance, samples with hot seed materials having higher anisotropy values result in a lower overwrite. For example, for an overhang of approximately 100 nm, use of a second hot seed layer 134 deposited using ion-beam deposition and having an anisotropy value of 173.4 Oe results in lower overwrite of approximately 32.8 db, whereas use of a second hot seed layer 134 deposited using PVD and having an anisotropy value of 16.9 Oe results in an overwrite of approximately 33.1 db. The ion deposition schemes (e.g., CIS and IBDS) are ion deposition techniques that use different scan methods to vary the anisotropy and texture of the deposited material. Materials having a higher anisotropy value deposited using a selected technique (e.g., CIS or IBDS) result in lower overwrite. Thus, using a material having a higher magnetic anisotropy value for the second hot seed layer 134 affects the writability, which provides the benefit of reducing the likelihood of recording on the adjacent track.

FIGS. 4 and 5 show that by appropriately designing the anisotropy values of the first hot seed layer 132 (i.e., the hot seed material used over the write pole) and the second hot seed layer 134 (i.e., in the regions of extending to the adjacent tracks), one can maintain high writability on the desired recording track while suppressing recording on the adjacent tracks.

Figure 6:
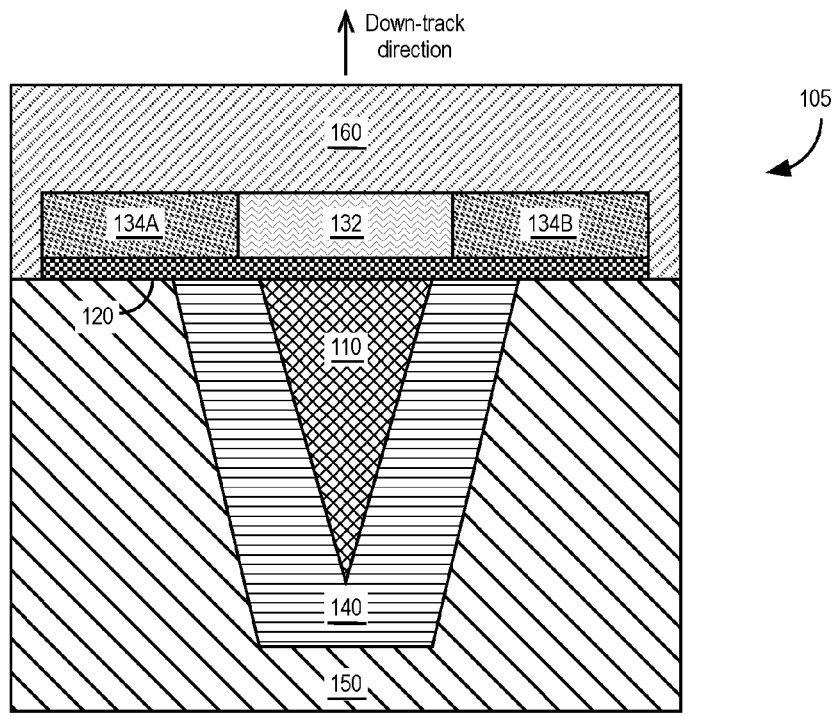
FIG. 6 illustrates an ABS view of a write portion of a magnetic read and write head having improved adjacent-track interference characteristics in accordance with some embodiments.

FIG. 6 illustrates an ABS view of a write portion 105 of a head 540 having improved adjacent-track-interference characteristics in accordance with some embodiments. Like the conventional write portion 100 of the head 540 shown in FIG. 2, the write portion 105 includes a main pole 110, a side gap 140, a side shield and leading edge shield region 150, a write gap 120, and a top shield 160. These components of the write portion 105 may be conventional. In addition to the conventional components, the write portion 105 illustrated in FIG. 6 includes two hot seed layers. A first hot seed layer 132 comprises a first hot seed material that has a first anisotropy value. In the ABS view illustrated in FIG. 6, in which the down-track direction is toward the top of the figure, the first hot seed layer 132 is on the write gap 120 and substantially over, and slightly wider than, the main pole 110. A second hot seed layer 134 comprises a second hot seed material that has a second anisotropy value larger than the first anisotropy value. In the ABS view of FIG. 6, a first portion of the second hot seed layer 134A is adjacent to one side of the first hot seed layer 132, and a second portion of the second hot seed layer 134B is adjacent to the other side of the first hot seed layer 132.

In some embodiments, the first hot seed material has a relatively low magnetic anisotropy value (e.g., in the range of 15-20 Oe) that is obtained by depositing a suitable first hot seed material using physical vapor deposition (PVD). Suitable first hot seed materials include, for example, $Fe_{75}Co_{25}$ or $Fe_{70}Co_{30}$. Although FIG. 6 uses fill patterns suggesting that the material used for the first hot seed layer 132 differs from the material from which the main pole 110 is made, the first hot seed layer 132 may be made from a material that is substantially similar or identical to the material used in the main pole 110.

In some embodiments, the second hot seed material is a high-moment, high-anisotropy (e.g., in the range of 75-150 Oe) material. For example, the second hot seed material may be made of $Fe_{75}Co_{25}$ or $Fe_{70}Co_{30}$ deposited using ion beam deposition or another higher-stress deposition technology. Alternatively, the second hot seed material may be $Fe_{50}Co_{50}$ deposited using, for example, ion beam deposition. In addition to the examples given herein, the second hot seed layer 134 may be made of another high-moment magnetic material having an anisotropy value $H_k$ that is significantly higher (e.g., at least three times higher) than the anisotropy value of the first hot seed layer 132. The paper entitled "Practical FeCo films for perpendicular write pole" in IEEE Transactions on Magnetics, Vol. 48, No. 5, May 2012, which is hereby incorporated by reference for all purposes, discusses FeCo materials that may be suitable for use in the first hot seed layer 132 and/or the second hot seed layer 134.

In some embodiments, the second anisotropy value (i.e., the anisotropy value of the second hot seed material) is at least three times the first anisotropy value (i.e., the anisotropy value of the first hot seed material). For example, the second anisotropy value may be between five and ten times the first anisotropy value. As a specific example, the first anisotropy value may be in the range of 15-20 Oe, whereas the second anisotropy value may be in the range of 75-150 Oe.

As illustrated in FIG. 6, the first hot seed layer 132 may be slightly wider than the width of the main pole 110 tip. In some embodiments, the thickness of the first hot seed layer 132 in the down-track direction at the ABS is approximately three times the thickness of the write gap 120. In some embodiments, the thickness of the second hot seed layer 134 in the down-track direction at the ABS is approximately or exactly the same as the thickness of the first hot seed layer 132.

Figure 7:
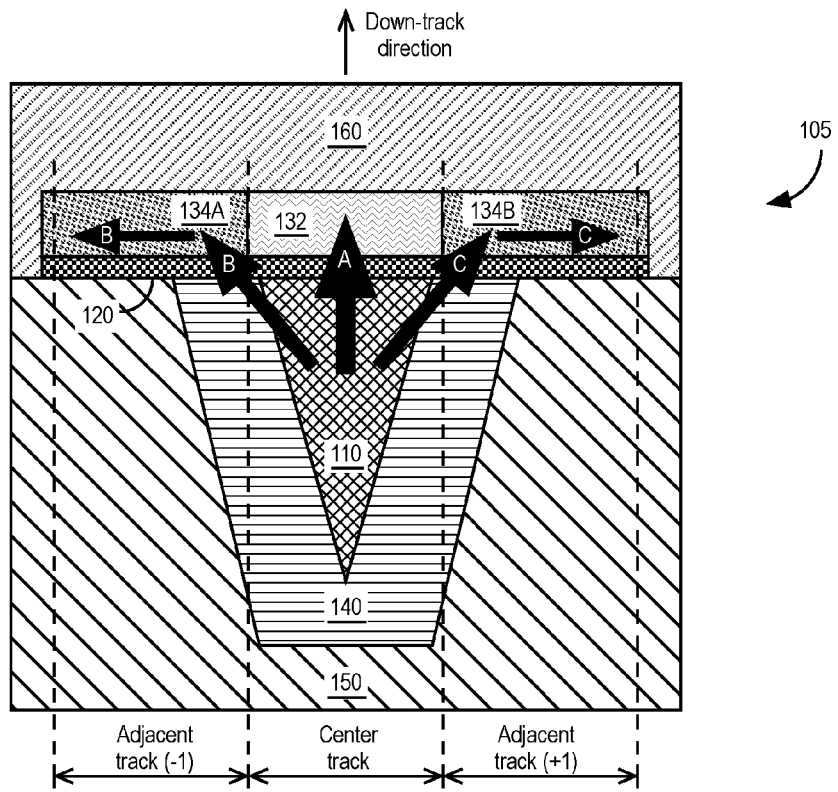
FIG. 7 illustrates how the write portion shown in FIG. 6 reduces the potential for adjacent-track interference.

FIG. 7 illustrates how the write portion 105 shown in FIG. 6 reduces the likelihood of adjacent-track interference when the head 540 writes to the disk 520. As shown by the arrow A, as when a conventional hot seed layer 130 is present, the write current causes a large component of the magnetic field to be produced over the center track of the disk 520 in the down-track direction. This component of the magnetic field interacts with the region of the disk 520 under the main pole 110 and causes information to be written to the disk 520 in accordance with the direction of the magnetic field. The arrows labeled B and C illustrate one benefit of the second hot seed layer 134, which, as illustrated in FIG. 7, includes portions 134A and 134B. Because the second hot seed layer 134 is made of a material that, relative to the first hot seed layer 132, is a harder material to switch, the second hot seed layer 134 helps dilute the concentration of magnetic flux into the shield that would otherwise interfere with the adjacent tracks and at least reduces the likelihood of those tracks being overwritten. In effect, the second hot seed layer 134 mitigates interference on the adjacent tracks by recording poorly on them. In other words, by suppressing the recording on the adjacent tracks while recording on the center track, the write portion 105 mitigates adjacent-track interference.

FIG. 8 is a flowchart illustrating a process 300 to fabricate a portion of a magnetic read and write head 540 having a first hot seed layer 132 and a second hot seed layer 134 in accordance with some embodiments (e.g., to fabricate a portion of a head 540 as shown in FIGS. 6 and 7, discussed above, and FIGS. 11 and 14, discussed below). At 302, the process 300 begins. At 304, the main pole 110 is formed using, for example, conventional techniques. At 306, the write gap 120 is formed over the main pole 110, where the word "over" indicates that in the ABS view in which the down-track direction is in the direction facing up, as illustrated in FIGS. 6, 7, 11, and 14, the write gap 120 is above the main pole 110. The write gap 120 may be formed using conventional techniques. At 308, a first hot seed layer 132 is formed on the write gap 120 and substantially over the main pole 110. The first hot seed layer 132 is made from a first hot seed material that has a first anisotropy value denoted in FIG. 8 as $H_{k1}$. At 310, a second hot seed layer 134 is formed adjacent to the first hot seed layer 132. The word "adjacent" indicates that in the ABS view in which the down-track direction is in the direction facing up, as illustrated in FIGS. 6, 7, 11, and 14, the second hot seed layer 134 is to the left and/or right of the first hot seed layer 132. The second hot seed layer 134 is made of a second hot seed material that has a second anisotropy value denoted in FIG. 8 as $H_{k2}$, where $H_{k2}$ is greater than $H_{k1}$ as described herein in the explanations of FIGS. 6, 7, 11, and 14. At 312, the process 300 ends.

It is to be understood that FIG. 8 does not include steps to fabricate other portions of the head 540, including some components of the write portions 105, 106, and 107 illustrated in FIGS. 6, 7, 11, and 14. For example, the process 300 of FIG. 8 does not include steps to fabricate the side gap 140, the side shield and leading edge shield region 150, or the top shield 160. These portions of the head 540 may be fabricated using conventional techniques. Moreover, FIG. 8 does not include steps to fabricate components of the head 540 used to read information from a disk 520. The read portion of a head 540 fabricated according to the process 300 may be conventional and may be fabricated using conventional techniques.

FIG. 9 is a flowchart illustrating a process 320 to fabricate a portion of a head 540 having a first hot seed layer 132 and a second hot seed layer 134 in accordance with some embodiments, such as those shown in FIGS. 6 and 7. The process 320 of FIG. 9 is one way to carry out the process 300 of FIG. 8. Specifically, the steps 328 through 336 of the process 320 are one exemplary way implement the steps 308 and 310 of the process 300.

Referring to FIG. 9, at 322, the process 320 starts. At 324, the main pole 110 is formed. Step 324 of the process 320 is identical to step 304 of the process 300. At 326, the write gap 120 is formed over the main pole 110. Step 326 of the process 320 is identical to step 306 of the process 300.

Figure 10A:
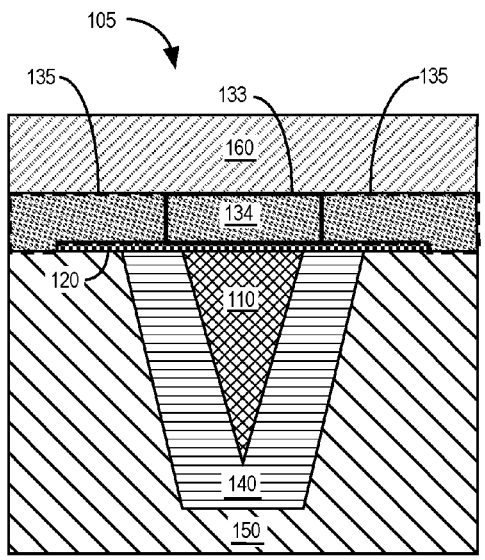
FIGS. 10A through 10D illustrate the write portion of an exemplary magnetic read and write head after various steps of the process illustrated in FIG. 9.
Figure 10B:
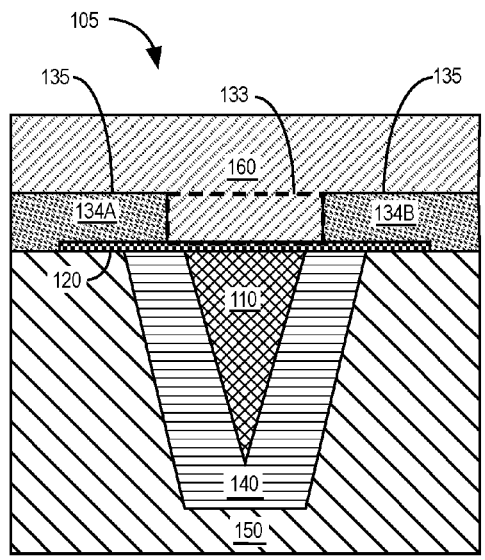

At 328, the second hot seed material is deposited over the write gap 120. FIG. 10A illustrates the write portion 105 after step 328 of the process 320. Referring again to FIG. 9, at 330, a mask, such as a photoresistive mask, is applied over the second hot seed material to protect the second hot seed region 135, which is the region in which the second hot seed layer 134 (including portions 134A and 134B) resides in the finished head 540. The mask does not protect the first hot seed region 133, which is the region in which the first hot seed layer 132 eventually resides in the finished head 540. At 332, the second hot seed material residing in the first hot seed region 133 is removed using any suitable method known to those of skill in the art. For example, the second hot seed material residing in the first hot seed region 133 may removed using well-known, conventional techniques, such as, for example, ion-milling or etching, to remove the second hot seed material residing in the first hot seed region 133. FIG. 10B illustrates the write portion 105 of the head 540 after step 332 of the process 320. In FIG. 10B, the second hot seed material has been removed from the first hot seed region 133, whereas the second hot seed layer 134 includes a first portion 134A and a second portion 134B in the second hot seed region 135.

Figure 10C:
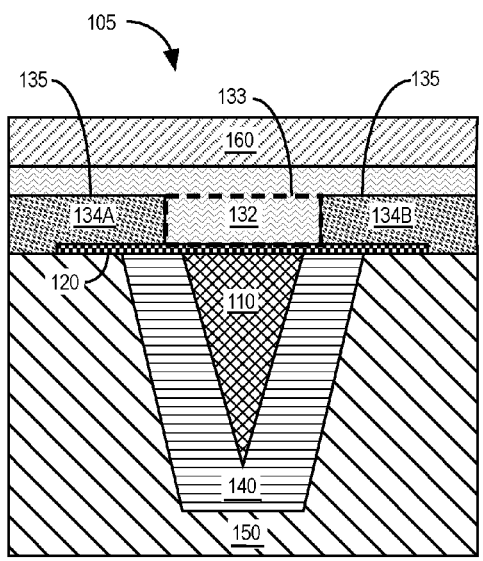
Figure 10D:
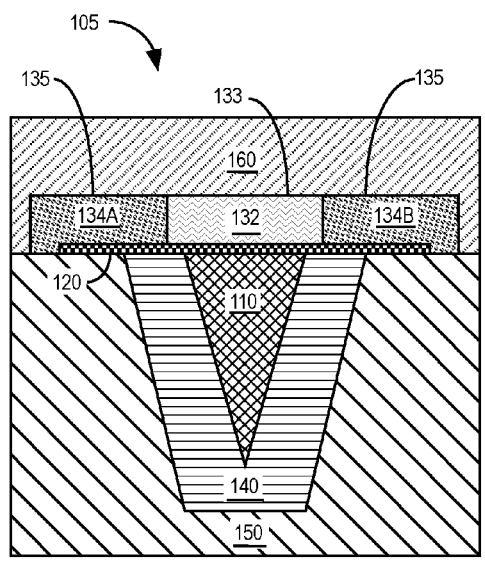

Referring again to FIG. 9, at 334, the first hot seed material is deposited in the first hot seed region 133. As shown in FIG. 10C, after step 334, the write portion 105 may have excess first hot seed material extending above the first hot seed region 133 and potentially also covering the second hot seed layer 134 (and the second hot seed region 135 in which the second hot seed layer 134 resides). If so, this excess first hot seed material may be removed at optional step 336 of process 320. FIG. 10D illustrates the write portion 105 after completion of step 336. The first hot seed layer 132 resides in the first hot seed region 133, and the second hot seed layer 134 resides in the second hot seed region 135. The second hot seed layer 134 comprises a first portion 134A that is adjacent to a first side of the first hot seed layer 132 and a second portion 134B that is adjacent to the other side of the first hot seed layer 133. Referring back to FIG. 9, at 338, the process 320 ends.

Figure 11:
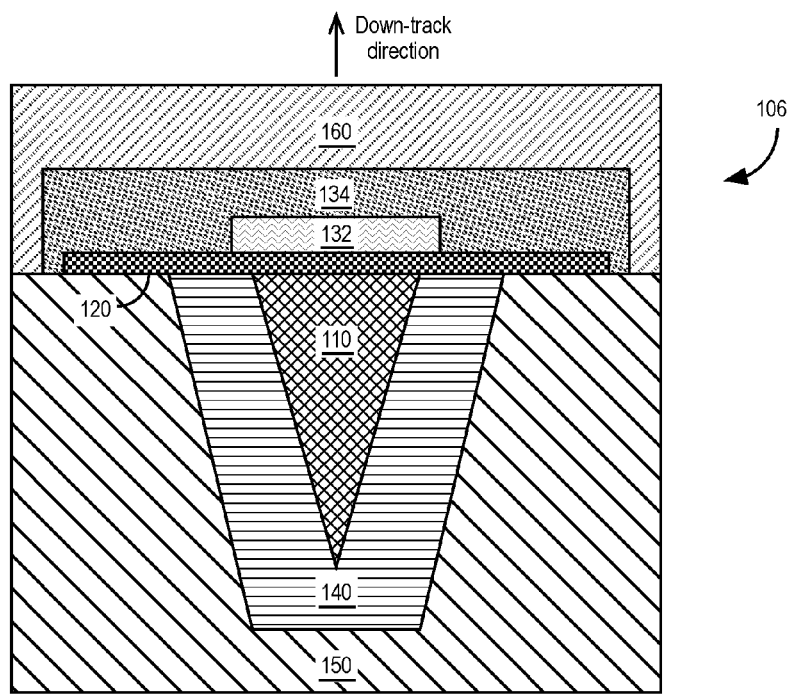
FIG. 11 illustrates an ABS view of a write portion of a magnetic read and write head having improved adjacent-track interference characteristics in accordance with some embodiments.

FIG. 11 illustrates an ABS view of a write portion 106 of a head 540 having improved adjacent-track-interference characteristics in accordance with some embodiments. Like the conventional write portion 100 of the head 540 shown in FIG. 2, and the exemplary write portion 105 shown in FIGS. 6 and 7, the write portion 106 includes a main pole 110, a side gap 140, a side shield and leading edge shield region 150, a write gap 120, and a top shield 160, all of which may be conventional. In addition, the write portion 106 illustrated in FIG. 11 includes two hot seed layers. A first hot seed layer 132 comprises a first hot seed material that has a first anisotropy value. In the ABS view illustrated in FIG. 11, in which the down-track direction is toward the top of the figure, the first hot seed layer 132 is on the write gap 120 and substantially over the main pole 110. A second hot seed layer 134 comprises a second hot seed material that has a second anisotropy value larger than the first anisotropy value. In the ABS view, the second hot seed layer 134 extends over and adjacent to the first hot seed layer 132.

In some embodiments, the first hot seed material has a relatively low anisotropy value (e.g., in the range of 15-20 Oe) that is obtained by depositing a suitable first hot seed material using PVD. Suitable first hot seed material may include, for example, $Fe_{75}Co_{25}$ or $Fe_{70}Co_{30}$. Although FIG. 11 uses fill patterns suggesting that the material used for the first hot seed layer 132 differs from the material from which the main pole 110 is made, the first hot seed layer 132 may be made from a material that is similar or identical to the material used in the main pole 110.

In some embodiments, the second hot seed material is a high-moment, high-anisotropy (e.g., in the range of 75-150 Oe) material. For example, the second hot seed material may be $Fe_{75}Co_{25}$ or $Fe_{70}Co_{30}$ deposited using ion beam deposition or another higher-stress deposition technology. Alternatively, the second hot seed material may be $Fe_{50}Co_{50}$ deposited using, for example, ion beam deposition. In addition to the examples given herein, the second hot seed layer 134 may be made of another high-moment magnetic material having an anisotropy value $H_k$ that is significantly higher than the anisotropy value of the first hot seed layer 132. The paper entitled "Practical FeCo films for perpendicular write pole" in IEEE Transactions on Magnetics, Vol. 48, No. 5, May 2012, discusses FeCo materials that may be suitable for use in the first hot seed layer 132 and/or the second hot seed layer 134.

In some embodiments, the second anisotropy value (i.e., the anisotropy value of the second hot seed material) is at least three times the first anisotropy value (i.e., the anisotropy value of the first hot seed material). For example, the second anisotropy value may be between five and ten times the first anisotropy value. As a specific example, the first anisotropy value may be in the range of 15-20 Oe, whereas the second anisotropy value may be in the range of 75-150 Oe.

As illustrated in FIG. 11, the first hot seed layer 132 is slightly wider than the width of the main pole 110 tip. In some embodiments, the thickness of the first hot seed layer 132 in the down-track direction at the ABS is approximately two times the thickness of the write gap 120. In some embodiments, the thickness in the down-track direction at the ABS of the portion of the second hot seed layer 134 that is adjacent to the first hot seed layer 132 is approximately twice the thickness of the first hot seed layer 132. In some embodiments, the thickness in the down-track direction at the ABS of the portion of the second hot seed layer 134 that is over the first hot seed layer 132 is approximately or exactly the same as the thickness of the first hot seed layer 132. In other embodiments, the thickness in the down-track direction at the ABS of the portion of the second hot seed layer 134 that is over the first hot seed layer 132 is greater than the thickness in the down-track direction at the ABS of the first hot seed layer 132.

FIG. 12 is a flowchart illustrating a process 350 to fabricate a portion of a head 540 having a first hot seed layer 132 and a second hot seed layer 134 in accordance with some embodiments, such as the embodiments shown in FIGS. 11 and 14 (discussed below). The process 350 of FIG. 12 is one way to carry out the process 300 of FIG. 8. Specifically, the steps 358 through 364 of the process 350 are one exemplary way implement the steps 308 and 310 of the process 300.

Referring to FIG. 12, at 352, the process 350 starts. At 354, the main pole 110 is formed. Step 354 of the process 350 is identical to step 304 of the process 300. At 356, the write gap 120 is formed over the main pole 110. Step 356 of the process 350 is identical to step 306 of the process 300.

At 358, the first hot seed material is deposited over the write gap 120. FIG. 13A illustrates the write portion 106 after step 358 of the process 350. As shown in the FIG. 13A, the first hot seed material may extend outside of the first hot seed region 133 into the second hot seed region 135. Referring again to FIG. 12, at 360, any first hot seed material in the second hot seed region 135 is removed using any suitable technique. For example, a mask, such as a photo-resistive mask, can be applied to protect the first hot seed region 133, which is the region in which the first hot seed layer resides in the finished head 540. The mask does not protect the second hot seed region 135, which is the region in which the second hot seed layer 134 eventually resides in the finished head 540. After the mask has been applied, the first hot seed material residing in the second hot seed region 135 may be removed using any suitable method known to those of skill in the art. For example, the first hot seed material residing in the second hot seed region 135 may removed using well-known, conventional techniques, such as, for example, ion-milling or etching, to remove the first hot seed material residing in the second hot seed region 135. FIG. 13B illustrates the write portion 106 after step 360 of the process 350.

Referring again to FIG. 12, at 362, the second hot seed material is deposited in the second hot seed region 135, which, as illustrated in FIGS. 13A through 13D, extends over the first hot seed region 133. As shown in FIG. 13C, after step 362, the write portion 106 may have excess second hot seed material extending outside of the second hot seed region 135. If so, this excess second hot seed material may be removed at optional step 364 of process 350. At 366, the process 350 ends. FIG. 13D illustrates the write portion 106 after completion of the process 350. The first hot seed layer 132 resides in the first hot seed region 133, and the second hot seed layer 134 resides in the second hot seed region 135.

Figure 14:
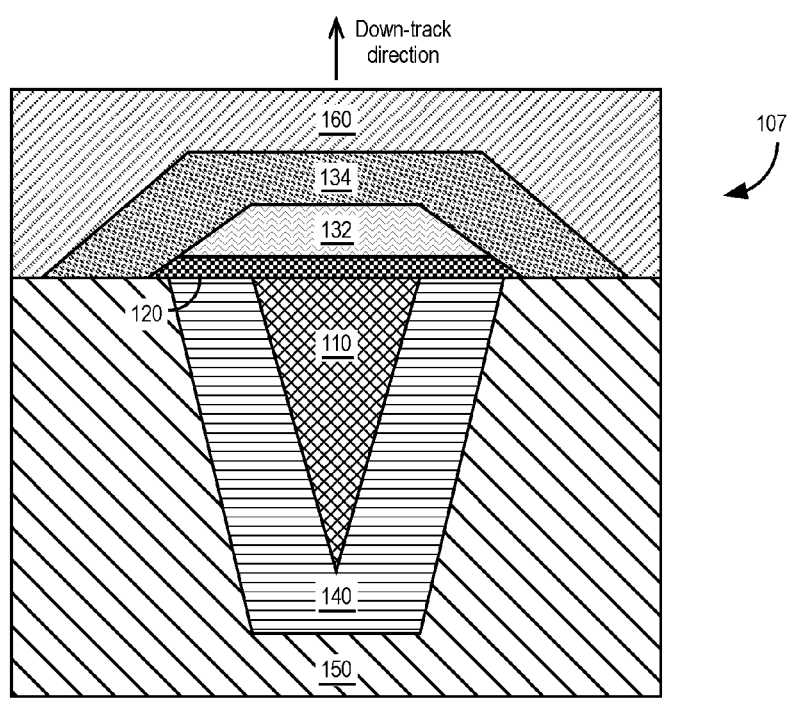
FIG. 14 illustrates an ABS view of a write portion of a magnetic read and write head having improved adjacent-track interference characteristics in accordance with some embodiments.

FIG. 14 illustrates an ABS view of a write portion 107 of a head 540 having improved adjacent-track-interference characteristics in accordance with some embodiments. Like the conventional write portion 100 of the head 540 shown in FIG. 2, the write portion 107 includes a main pole 110, a side gap 140, a side shield and leading edge shield region 150, a write gap 120, and a top shield 160, all of which may be conventional. In addition, the write portion 107 illustrated in FIG. 14 includes two hot seed layers. A first hot seed layer 132 comprises a first hot seed material that has a first anisotropy value. In the ABS view illustrated in FIG. 14, in which the down-track direction is toward the top of the figure, the first hot seed layer 132 is on the write gap 120 and substantially over the main pole 110. A second hot seed layer 134 comprises a second hot seed material that has a second anisotropy value larger than the first anisotropy value. In the ABS view, the second hot seed layer 134 extends over and adjacent to the first hot seed layer 132.

In some embodiments, the first hot seed material has a relatively low anisotropy value (e.g., in the range of 15-20 Oe) that is obtained by depositing a suitable first hot seed material using PVD. Suitable first hot seed materials may include, for example, $Fe_{75}Co_{25}$ or $Fe_{70}Co_{30}$. Although FIG. 14 uses fill patterns suggesting that the material used for the first hot seed layer 132 differs from the material from which the main pole 110 is made, the first hot seed layer 132 may be made from a material that is similar or identical to the material used in the main pole 110.

In some embodiments, the second hot seed material is a high-moment, high-anisotropy (e.g., in the range of 75-150 Oe) material. For example, the second hot seed material may be $Fe_{75}Co_{25}$ or $Fe_{70}Co_{30}$ deposited using ion beam deposition or another higher-stress deposition technology. Alternatively, the second hot seed material may be $Fe_{50}Co_{50}$ deposited using, for example, ion beam deposition. In addition to the examples given herein, the second hot seed layer 134 may be made of another high-moment magnetic material having an anisotropy value $H_k$ that is significantly higher than the anisotropy value of the first hot seed layer 132. The paper entitled "Practical FeCo films for perpendicular write pole" in IEEE Transactions on Magnetics, Vol. 48, No. 5, May 2012, discusses FeCo materials that may be suitable for use in the first hot seed layer 132 and/or the second hot seed layer 134.

In some embodiments, the second anisotropy value (i.e., the anisotropy value of the second hot seed material) is at least three times the first anisotropy value (i.e., the anisotropy value of the first hot seed material). For example, the second anisotropy value may be between five and ten times the first anisotropy value. As a specific example, the first anisotropy value may be in the range of 15-20 Oe, whereas the second anisotropy value may be in the range of 75-150 Oe.

As illustrated in FIG. 14, the first hot seed layer 132 is wider than the width of the main pole 110 tip. In some embodiments, the thickness of the first hot seed layer 132 in the down-track direction at the ABS is approximately one-and-a-half to two times the thickness of the write gap 120. In some embodiments, the thickness in the down-track direction at the ABS of the portion of the second hot seed layer 134 that is adjacent to the first hot seed layer 132 is, at its thickest, approximately twice the thickness of the first hot seed layer 132. In some embodiments, the thickness in the down-track direction at the ABS of the portion of the second hot seed layer 134 that is over the first hot seed layer 132 is approximately or exactly the same as the thickness of the first hot seed layer 132. In other embodiments, the thickness in the down-track direction at the ABS of the portion of the second hot seed layer 134 that is over the first hot seed layer 132 is greater than the thickness in the down-track direction at the ABS of the first hot seed layer 132.

Figure 15A:
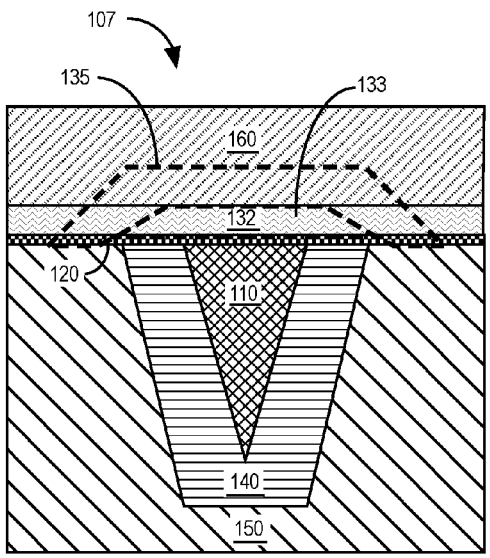
FIGS. 15A through 15D illustrate the write portion of an exemplary magnetic read and write head after various steps of the process illustrated in FIG. 12.
Figure 15B:
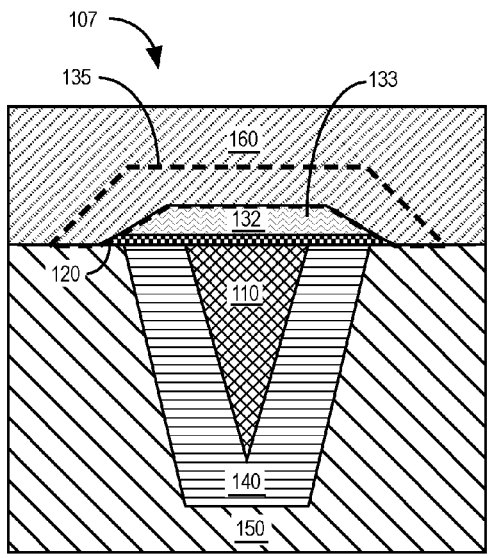

The write portion 107 illustrated in FIG. 14 may be fabricated using the process 350 illustrated in FIG. 12. Referring to FIG. 12, at 352, the process 350 starts. At 354, the main pole 110 is formed. At 356, the write gap 120 is formed over the main pole 110. At 358, the first hot seed material is deposited over the write gap 120. FIG. 15A illustrates the write portion 107 after step 358 of the process 350. As shown in the FIG. 15A, the first hot seed material may extend outside of the first hot seed region 133 into the second hot seed region 135. Referring again to FIG. 12, at 360, any first hot seed material in the second hot seed region 135 is removed using any suitable technique. For example, a mask, such as a photoresistive mask, can be applied to protect the first hot seed region 133, which is the region in which the first hot seed layer resides in the finished head 540. The mask does not protect the second hot seed region 135, which is the region in which the second hot seed layer 134 eventually resides in the finished head 540. After the mask has been applied, the first hot seed material residing in the second hot seed region 135 may be removed using any suitable method known to those of skill in the art. For example, the first hot seed material residing in the second hot seed region 135 may removed using well-known, conventional techniques, such as, for example, ion-milling or etching, to remove the first hot seed material residing in the second hot seed region 135. FIG. 15B illustrates the write portion 107 after step 360 of the process 350. As shown in FIG. 15B, a portion of the write gap may also be removed along with any first hot seed material extending beyond the first hot seed region 133.

Figure 15C:
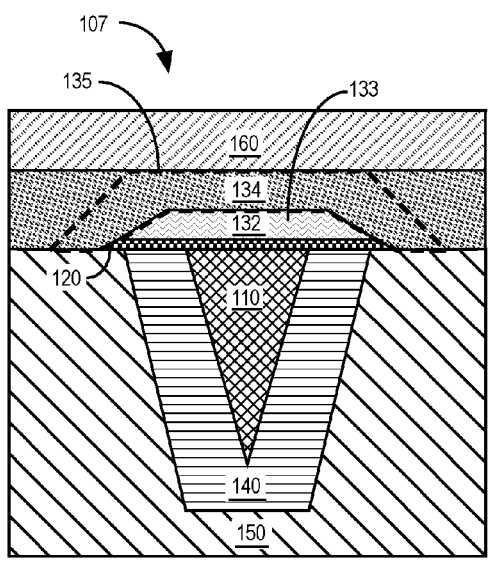
Figure 15D:
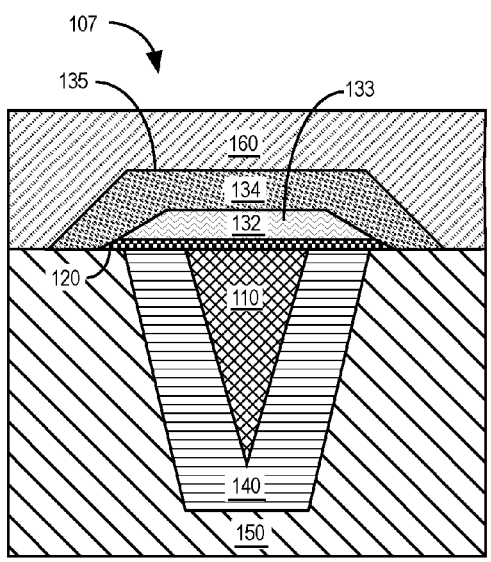

Referring again to FIG. 12, at 362, the second hot seed material is deposited in the second hot seed region 135, which, as illustrated in FIGS. 15A through 15D, extends over the first hot seed region 133. As shown in FIG. 15C, after step 362, the write portion 107 may have excess second hot seed material extending beyond the second hot seed region 135. If so, this excess second hot seed material may be removed at optional step 364 of process 350. At 366, the process 350 ends. FIG. 15D illustrates the write portion 107 after completion of the process 350. The first hot seed layer 132 resides in the first hot seed region 133, and the second hot seed layer 134 resides in the second hot seed region 135.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A magnetic write head, comprising:
   a main pole;
   a write gap, wherein, in an air-bearing surface (ABS) view of the magnetic write head, the write gap is over the main pole;
   a first hot seed layer comprising a first hot seed material having a first anisotropy value, wherein, in the ABS view of the magnetic write head, the first hot seed layer is on the write gap and substantially over the main pole; and
   a second hot seed layer comprising a second hot seed material having a second anisotropy value, the second anisotropy value being greater than the first anisotropy value, wherein, in the ABS view of the magnetic write head, at least a portion of the second hot seed layer is adjacent to the first hot seed layer.

2. The magnetic write head recited in claim 1, wherein the second anisotropy value is at least three times the first anisotropy value.

3. The magnetic write head recited in claim 1, wherein the first anisotropy value is between approximately 15 and 20 Oe, and the second anisotropy value is between approximately 75 and 150 Oe.

4. The magnetic write head recited in claim 1, wherein the second hot seed layer includes a first portion adjacent to a first side of the first hot seed layer and a second portion adjacent to a second side of the first hot seed layer.

5. The magnetic write head recited in claim 1, wherein a thickness of the first hot seed layer or the second hot seed layer is approximately three times a thickness of the write gap.

6. The magnetic write head recited in claim 1, wherein the second hot seed layer extends over the first hot seed layer.

7. A hard disk drive comprising the magnetic write head recited in claim 1.

8. A method of fabricating a magnetic write head, the method comprising:
   forming a main pole;
   forming a write gap such that, in an air-bearing surface (ABS) view of the magnetic write head, the write gap is over the main pole;
   forming a first hot seed layer such that, in the ABS view of the magnetic write head, the first hot seed layer is on the write gap and substantially over the main pole, wherein the first hot seed layer comprises a first hot seed material having a first anisotropy value; and
   forming a second hot seed layer such that, in the ABS view of the magnetic write head, at least a portion of the second hot seed layer is adjacent to the first hot seed layer, wherein the second hot seed layer comprises a second hot seed material having a second anisotropy value, the second anisotropy value being greater than the first anisotropy value.

9. The method recited in claim 8, wherein the second anisotropy value is at least three times the first anisotropy value.

10. The method recited in claim 8, wherein the first anisotropy value is between approximately 15 and 20 Oe, and the second anisotropy value is between approximately 75 and 150 Oe.

11. The method recited in claim 8, wherein forming the second hot seed layer comprises:
    depositing the second hot seed material over the write gap;
    applying a mask to expose a first hot seed region and to protect a second hot seed region; and
    removing a portion of the second hot seed material from the first hot seed region.

12. The method recited in claim 11, wherein the mask is a photolithographic mask, and wherein removing the portion of the second hot seed material from the first hot seed region comprises exposing the magnetic write head to a light source.

13. The method recited in claim 11, wherein forming the first hot seed layer comprises:
    after removing the portion of the second hot seed material from the first hot seed region, depositing the first hot seed material in the first hot seed region.

14. The method recited in claim 8, wherein forming the first hot seed layer comprises:
    depositing the first hot seed material on the write gap, the deposited first hot seed material comprising a first portion residing in a first hot seed region and a second portion residing in a second hot seed region; and removing the second portion of the first hot seed material.

15. The method recited in claim 14, wherein the second hot seed region extends over the first hot seed region.

16. The method recited in claim 14, wherein forming the second hot seed layer comprises:

after removing the second portion of the first hot seed material, depositing the second hot seed material in the second hot seed region.

17. The method recited in claim 16, further comprising:

removing a portion of the second hot seed material.

18. The method recited in claim 17, wherein removing the portion of the second hot seed material comprises milling to confine the second hot seed material to the second hot seed region.

19. A magnetic write head fabricated using the method recited in claim 8.

20. A hard disk drive comprising the magnetic write head recited in claim 19.

* * * * *